United States Patent [19]

Brown et al.

[11] 4,387,181

[45] Jun. 7, 1983

[54] POLYMER COMPOSITIONS AND MANUFACTURE

[75] Inventors: Robert A. Brown, Williamsville; Jesús L. Caamano, Amherst; Henry A. Kasprzak, Luchawanna, all of N.Y.

[73] Assignee: Textron, Inc., Providence, R.I.

[21] Appl. No.: 138,750

[22] Filed: Apr. 9, 1980

[51] Int. Cl.$^3$ .................. C08J 3/02; C08L 75/02; C08L 75/04

[52] U.S. Cl. .................... 524/714; 524/104; 524/589; 524/591; 524/839; 524/840

[58] Field of Search .............. 260/29.2 TN; 528/45; 524/591, 839, 840, 589, 704, 714

[56] References Cited

U.S. PATENT DOCUMENTS

| | | | |
|---|---|---|---|
| Re. 29,711 | 7/1978 | Wood | 260/29.2 TN |
| 3,412,054 | 11/1968 | Milligan et al. | 260/29.2 TN |
| 3,479,310 | 11/1969 | Dieterich et al. | 260/29.2 TN |
| 3,640,924 | 2/1972 | Hermann et al. | 260/29.2 TN |
| 3,655,627 | 4/1972 | Hutzler et al. | 260/29.2 TN |
| 3,736,216 | 5/1973 | Hermann et al. | 260/29.2 TN |
| 3,781,238 | 12/1973 | Helm | 260/29.2 TN |
| 3,849,360 | 11/1974 | Farah et al. | 260/29.2 TN |
| 3,870,684 | 3/1975 | Witt et al. | 260/29.2 TN |
| 4,016,122 | 4/1977 | Matsuda et al. | 260/29.2 TN |
| 4,046,729 | 9/1977 | Scriven et al. | 260/29.2 TN |
| 4,066,591 | 1/1978 | Scriven et al. | 260/29.2 TN |
| 4,203,883 | 5/1980 | Hangauer, Jr. | 260/29.2 TN |
| 4,248,756 | 2/1981 | König et al. | 260/31.2 N |
| 4,299,868 | 11/1981 | Berndt et al. | 524/591 |

OTHER PUBLICATIONS

Wright et al., "Solid Polyurethane Elastomers", Maclaren & Sons, London, 1969, p. 14.

U.S. Defensive Publication, T900,008, Published 7/92.
Dieterich et al., Agnew Chem., 9:1, pp. 40–50, (1970).
Dieterich et al., Journal of the Oil and Colour Chemists Association, 53, pp. 363–379, (1970).

*Primary Examiner*—Allan Lieberman
*Attorney, Agent, or Firm*—Bernard, Rothwell & Brown

[57] ABSTRACT

There are disclosed aqueous dispersions of salts, e.g., tertiary amine salts, of polyamine-extended, aromatic polyisocyanate-based prepolymers having carboxylic groups, especially such dispersions made from prepolymers of polyisocyanates in which the isocyanate groups are on different aromatic rings. These products, as well as, aqueous dispersions of salts of prepolymers of aromatic polyisocyanates can be made from blocked, aromatic polyisocyanate-based prepolymers, particularly oxime-blocked prepolymers. The polymer salts can have sufficient neutralized, carboxylic groups to provide stable, aqueous dispersions, and the dispersions of the polyamine-extended polymers have infinite dilutability with water and excellent resistance to gelling upon freezing and thawing. Carboxylic groups can be supplied to the prepolymers by reactants having two or more groups containing isocyanate-reactive hydrogen atoms employed in making the aromatic isocyanate prepolymers, particularly dihydroxy alkanoic acids. The polymer salts may be stably dispersed in the aqueous medium, even in the absence of substantial amounts of cosolvents, and the aqueous dispersions of the extended prepolymers are useful as, for instance, coatings for solid substrates to provide water resistance. The solvent resistance of coatings made from the polyamine-extended dispersions of polyether-derived prepolymers may be increased by using at least trifunctional amines to extend the prepolymers.

57 Claims, No Drawings

POLYMER COMPOSITIONS AND MANUFACTURE

This invention relates to novel, stable, aqueous dispersions of prepolymers of aromatic polyisocyanates, and to processes for manufacturing the dispersions. The invention provides aqueous dispersions of salts of aromatic polyisocyanate-based prepolymers having carboxylic groups, especially prepolymers of aromatic polyisocyanates in which the isocyanate groups are on different aromatic rings. These products, as well as, stable, aqueous dispersions of urea-urethanes and polyureas produced by polyamine-extension of the prepolymer salts, can be made from blocked, aromatic polyisocyanate derived prepolymers which contain carboxylic groups. The blocked, carboxyl group-containing prepolymers are another aspect of the invention. The aqueous dispersions of the invention are essentially infinitely dilutable with water, and the polymer salts may be stably dispersed in the aqueous medium, even in the absence of an extraneous emulsifier, and often in the absence of substantial amounts of cosolvents. The dispersions of the polyamine-extended prepolymers have excellent resistance to gelling upon freezing and thawing and are suitable for use as, for instance, water-resistant coatings and adhesive compositions. The solvent resistance of coating made from the polyamine-extended dispersions of polyether-derived prepolymers may be increased by using at least a portion of polyamine having tri or greater functionality to extend the prepolymers.

Urea-urethanes have found widespread use in coatings for fabrics, plastics, wood, metal, and the like, due to their advantageous properties such as their good chemical resistance, abrasion-resistance, toughness, elasticity and durability, and their ability to cure rapidly. Polyureas are also useful as coatings. Conventionally, these coatings have often been applied as solutions in, for instance, polar, organic solvents or blends of polar, organic solvents with aromatic hydrocarbons. When the coating is dried or cured, the solvents vaporize into the atmosphere as a serious economic loss and, quite importantly, the vaporous solvents may pollute the atmosphere.

Aqueous coating compositions are, therefore, particularly desirable due to the low cost and availability of water. Moreover, aqueous coating compositions are advantageous since the evaporation of water into the atmosphere has no adverse effect on the environment whereas conventionally employed organic solvents may be toxic, odoriferous, or photochemically-sensitive, and thus, may be smog-formers in the daylight atmosphere due to photochemical oxidation. Furthermore, water which is readily available can be used to thin the water-based coating compositions and can be used in cleanup operations. However, urea-urethanes and polyureas generally are not compatible with water unless special ingredients and/or particular steps of manufacture are employed in their synthesis.

One approach to provide water-dispersible, polyurea-urethane and polyurea-containing compositions has been through the use of extraneous emulsifiers. This procedure generally suffers from the disadvantages that the dispersions are relatively unstable and the resultant films are water-sensitive.

Milligan and Hoy disclose in U.S. Pat. No. 3,412,054, water-dilutable polyurethanes made by incorporating in the urethane polymer, carboxylic acid groups which are reacted with ammonia or amines to provide hydrophilic, carboxylic acid salt groups on the polymer. These ion-containing polymeric materials, or ionomers, are not infinitely dilutable. The patentees disclose the use of an organic cosolvent to permit dilution down to about 5 percent resin solids, without the resin separating from the dispersion to a significant extent. Greater dilution may be particularly desirable when cleaning equipment used in forming the coatings, otherwise the dispersions may separate and provide a material that cannot be easily removed by water.

U.S. Pat. No. 4,203,883 to Hangauer, pertains to aqueous dispersions of tertiary amine salts of urea-urethane polymers made from isocyanate-terminated, urethane prepolymers of aliphatic or cycloaliphatic diisocyanates, toluene diisocyanate or xylene diisocyanate and carboxylic group-containing polyols. The prepolymers, especially those made from aliphatic or cycloaliphatic diisocyanates, are relatively stable when water and tertiary amine salt are added to form an aqueous dispersion prior to reaction of the mixture with polyamine to chain-extend the polymer. This stability is considerably lessened when the prepolymer is made from toluene diisocyanate. Combination of the prepolymer with water and tertiary amine results in rapid reaction and gelation. This effect can be avoided by neutralizing the prepolymer with the tertiary amine in the absence of water, after which the water is added rapidly, followed immediately by the polyamine. The tertiary amine is, however, a catalyst for the reaction of isocyanate groups with carboxylic groups to give amide crosslinks and carbon dioxide gas which results in foaming. This reaction begins in about thirty minutes, so that only a short period of time is available for blending the tertiary amine with the prepolymer before adding the water and polyamine. This limitation materially restricts the manufacturing procedure and is quite disadvantageous.

Such gelling and foaming in the case of toluene diisocyanate-based, isocyanate-terminated prepolymers may be avoided by adding hot prepolymer to an aqueous blend of salt-forming tertiary amine and chain-extending polyamine to obtain an aqueous dispersion urea-urethane polymer, see Examples 15 and 18 of U.S. Pat. No. 4,066,591 to Scriven and Chang. The resulting dispersions have been found, however, to gel after experiencing only one freeze-thaw cycle. The need for further improvement in these products is apparent.

Before the present invention we were unable to prepare aqueous dispersions from urethane prepolymers of carboxylic group-containing polyols and aromatic diisocyanates in which the isocyanate groups are on different aromatic rings, e.g. diphenylmethane diisocyanate. The addition to the prepolymer of a tertiary amine such as triethylamine instantly causes exothermic gelling and foaming so that water cannot be added to produce a dispersion. The preparation of stable, aqueous dispersions of such prepolymers and their polyamine derivatives is highly desirable.

In one aspect of the present invention, there are provided stable, aqueous dispersions of polyurea-urethane or polyurea polymers that are essentially infinitely dilutable with water, and these polymers are made from blocked prepolymers of aromatic polyisocyanates, including polyisocyanates having isocyanate groups on different aromatic rings. The appearance of the dispersions may be from opaque to relatively clear, and may approach, if not reach, the appearance of a solution. The rheological properties of the dispersions generally resemble those of a true solution. The dispersions may also be in the form of emulsions that are in essence stable. Although these polymer dispersions of the invention are infinitely dilutable with water, they can form cured films having good resistance to water. The polymers may be fully polymerized such that no further reactions need occur during their curing. The films can cure at room temperature, and thus may be described as low energy-consuming materials, and they may be relatively non-polluting since little, if any, organic volatile material need be present in the composition. These dispersions of the invention may have a relatively neutral pH, thus a wide selection of pigments can be used without having compatibility problems with the dispersions, and the polymers need not be subjected to high pH conditions which may otherwise tend to promote hydrolysis of the polymer chain.

The polyamine extended polymers of this invention can be made by reacting polyamine with an aqueous dispersion of neutralized, blocked, aromatic polyisocyanate prepolymers containing urethane or urea groups or both. The blocked, aromatic isocyanate prepolymers are another aspect of the invention and can be formed by the reaction of an aromatic polyisocyanate and a material having two or more hydrogen atoms that react with isocyanate groups. The latter reactants may contain the active hydrogen atoms in one or more hydroxyl or amine groups. A given reactant may contain one or both types of such groups, or mixtures of polyols and polyamines may be employed in forming the prepolymers. At least a portion of the material reacted with the isocyanate has at least one carboxylic group that is relatively non-reactive with aromatic isocyanates. The resulting isocyanate-terminated prepolymer is blocked, preferably with an oxime. A portion or all of the carboxylic groups of the polymer can be neutralized, preferably with tertiary amine groups, to provide a polymer which can have a relatively neutral pH in an aqueous dispersion, e.g., having a pH of less than about 11, preferably less than about 9.5. The pH is most preferably greater than 7.

The blocked, aromatic isocyanate prepolymers employed in this invention can be made by the reaction of aromatic polyisocyanates with polyol and/or polyamine and a blocking agent such as an oxime. At least a portion of the overall reactants used to make the prepolymers has at least one carboxylic acid group

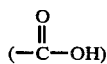

or carboxylate ion group

per molecule, which group is relatively non-reactive with aromatic isocyanate groups. Both the carboxylic acid group and carboxylate ion group are referred to herein as carboxylic groups. Thus, the isocyanate groups of the aromatic polyisocyanate react preferentially with the hydroxyl groups of the polyol, the amino groups of the polyamine and, possibly, other active hydrogen-containing material present, if any, to provide a prepolymer structure with terminal isocyanate groups available for reaction with a blocking agent and with pendant carboxylic groups available for salt formation.

In the case of oxime blocking agents the exothermic reaction proceeds according to the following generalized reaction where R' is an aromatic hydrocarbon residue and R is a hydrocarbyl group or hydrogen:

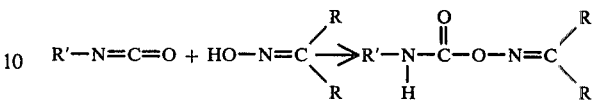

It is preferred to have excess blocking agent present in the reaction mixture to insure the reaction of essentially all of the isocyanate groups. Thus, at least about 1.05 moles of the agent may be used per equivalent of isocyanate group and, more preferably, at least about 1.1 moles of the agent per isocyanate group equivalent. The blocked prepolymers may contain a minor amount of free isocyanate groups and generally have a free isocyanate group content of below about 0.5, say below about 0.2, weight percent or preferably somewhat less on a non-solvent basis. The prepolymers are often in an essentially liquid state, either as the polymer per se or dissolved in a solvent, at ambient temperatures, e.g., about 15° to 45° C.

The carboxylic acid group-containing, blocked prepolymer can be reacted with a salt-forming base, preferably a tertiary amine, in an amount which enhances the water-dispersability of the neutralized, polymers formed in accordance with this invention. The increase in water-dispersability thereby provided is generally sufficient for the neutralized polymer to be infinitely dilutable by water. Thus, in the aqueous dispersion the amount of ionized carboxylic group

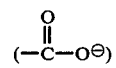

available from the neutralized carboxylic group in salt form may generally be at least about 1.3, e.g., about 1.3 to 6, weight percent of the neutralized polymer on a non-solvent, non-aqueous basis, i.e., solids basis, preferably at least about 1.6 weight percent, say about 1.6 to 6 weight percent. For example, the amount of carboxylic group-containing material reacted may provide unneutralized, prepolymer solids having an acid value of at least about 20 or 25, preferably about 30 to 50, or 80, on a solids basis. As the acid value increases, the water resistance of the coatings formed from the dispersions may be lessened. Aside from tertiary amine groups, the base may be, for example, an alkali metal hydroxide or quaternary ammonium hydroxide.

The active hydrogen-containing materials used in making the prepolymers include polyols and polyamines as stated above, and the overall reactants employed supply the desired carboxylic group to the prepolymer. Among these reactants are polyols and polyamines that may be of various molecular weights and whose selection may depend on the ultimate intended utility of the product or its desired characteristics. Many of these general relationships are known in the art. The carboxylic groups may be supplied by either the polyol, polyamine or other reactant used in making the prepolymer, and mixtures of such reactants may be employed, or a given reactant may bear both reactive hydroxyl and amino groups. The carboxylic group-containing reactant may frequently provide at least about 3 to, say, up to about 90, or more, preferably about 5 to 50 weight percent of the total active hydrogen-containing reactant in the prepolymer. The amino groups of the active hydrogen-containing materials are preferably primary, and reactants exhibiting a functionality of more than two groups containing active hydrogen atoms per molecule, especially hydroxyl and primary amino groups, may be controlled as to amount to avoid obtaining unduly cross-linked products. It is preferred that the materials having a reacting functionality of greater than two, if present, be a minor equivalent amount of such reactants, especially if the active hydrogen atoms are in more than two hydroxyl or primary amino groups. The molecular weights of the isocyanate-active hydrogen-containing reactants may be in a wide range, and often these materials have molecular weights of up to about 5,000. The molecular weights of the prepolymers may often be up to about 6,000 or somewhat more, preferably up to about 3,000. The molecular weight of the prepolymers may generally be at least about 500.

Carboxylic group-containing polyols used in accordance with this invention are advantageously dihydroxy materials, and the dihydroxy-containing alkanoic acids are preferred. The carboxylic group-containing polyol can be reacted, without significant reaction between the carboxylic groups and the aromatic diisocyanate component. Among the polyols which may be employed are those which have relatively unreactive, free carboxylic acid groups, for instance, alkanoic acids having two substituents on the alpha carbon atom. The substituent may be, e.g., a hydroxyl or alkyl group, for example, an alkylol group. A preferred group of dihydroxy alkanoic acids are the $\alpha,\alpha$-dimethylol alkanoic acids which may be represented by the structural formula

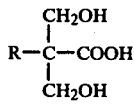

wherein R is alkyl, e.g., lower alkyl, say, of 1 to about 8 carbon atoms. The $\alpha,\alpha$-dimethylol alkanoic acids which may be employed in accordance with this invention include 2,2-dimethylol propionic acid, 2,2-dimethylol butyric acid, 2,2-dimethylol pentanoic acid, and the like. A preferred dihydroxy alkanoic acid is 2,2-dimethylol propionic acid.

Polyols or polyamines in addition to the carboxylic group-containing reactants may be employed in making the prepolymers, and the additional polyols or polyamine include those having a molecular weight of at least about 400. Generally, the average molecular weight of these additional reactants may not exceed about 5,000, and is preferably about 400 to 2,500. These additional polyols or polyamines may comprise up to about 95 weight percent of the total polyol comprising the carboxylic group-containing polyol and additional polyol and/or polyamine. The amount of additional polyol or polyamine may often be the major weight amount of the material reacted with the diisocyanate, and preferably this amount is at least about 60 or 70 weight percent.

Particularly desirable aliphatic polyols and polyamines are those represented by the formula:

$$X-R'-[(OR'')_nX]_m$$

in which X is —OH or —NH$_2$, R' is a hydrocarbon radical, preferably saturated, and R'' is an alkylene radical of 2 to about 4, preferably 3 to 4, carbon atoms. R' preferably has 2 to about 12, advantageously 2 to 4, carbon atoms. The letter n represents a number up to about 50, depending on the molecular weight desired, while the letter m is at least say up to 1 to 2 or more, and is preferably 1, i.e., the reactant is a diol or diamine. Among the reactants which may be employed are the polyether polyols and polyether polyamines of up to about 2,500 or 5,000 or more molecular weight, such as the polyoxyethylene polyols, polyoxypropylene polyols, polyoxybutylene polyols and the corresponding amino-terminated polyethers. These materials include the straight chain polyoxybutylene glycols often referred to as tetramethyleneether glycols, as well as the branched-chain polyoxybutylene glycols, made, for instance, from 1,2-and 2,3-butylene oxides. Among the preferred polyether reactants are those having molecular weights of at least about 400, or even at least about 1,000. It is also preferred that the polyethers not contain excessive amounts of ether groups since the resulting polymers tend to swell in water.

Other desirable reactants which may be employed include the polyester polyols and polyester polyamines of up to about 5,000 or more, e.g., about 400 to 4,000 or 5,000, molecular weight which may be derived, for instance, from a polyol and dicarboxylic acid or hydroxy carboxylic acid or lactone. The dicarboxylic acid, hydroxy carboxylic acid or lactone may often have from 3 to about 30, preferably 4 to about 12, carbon atoms and may be aliphatic, alicyclic, aromatic or mixed structures of these types. The dicarboxylic acid, hydroxy carboxylic acid, or lactone may be substituted with groups which do not deleteriously affect the production of the desired urea-urethane or polyurea products. Exemplary dicarboxylic acids and anhydrides which may be employed in this invention are orthophthalic acid, orthophthalic acid anhydride, isophthalic acid, terephthalic acid, adipic acid, cyclohexane-1,4-dicarboxylic acid, succinic acid, succinic acid anhydride, sebacic acid, dimers of olefinically-unsaturated monocarboxylic acids, such as linoleic acid dimer, and the like, and their mixtures. Minor amounts of carboxylic acids having three or more carboxylic groups may also be present during formation of the polyester polyols. The hydroxy carboxylic acids which may be employed as a reactant in providing a hydroxy-terminated polyester polyol include, for instance, hydroxycaproic acid, hydroxybutyric acid, hydroxydecanoic acid, hydroxystearic acid, and the like. Useful lactones include caprolactone, butyrolactone, and the like. The polyols which may be employed in preparing the polyester polyols are often low molecular weight polyols, e.g., diols having, say, up to about 20 carbon atoms. Exemplary of the polyols which may be employed to prepare polyester polyols are 1,6-hexanediol, neopentyl glycol, 1,1,1-trimethylol propane, ethylene glycol, 1,4-butanediol, 1,4-bis(hydroxymethyl)cyclohexane and the like. The corresponding polyamine polyesters may be prepared by converting the hydroxyl groups of the polyol polyesters to primary amino groups.

The polyol or polyamine component used in making the prepolymers employed in the present invention may contain low molecular weight polyol to enhance the hardness of the films. The low molecular weight polyol may often have a molecular weight of up to, say, about 400, e.g., about 60 to 400, and can contain aliphatic, alicyclic, or aromatic groups. Frequently, the low molecular weight poloyl, when employed, is at least about 1, preferably about 2 to 30, weight percent of the overall polyol component. Among the advantageous low molecular weight polyols are those having up to about 20 carbon atoms per molecule, for instance, ethylene glycol, 1,2-propanediol, 1,3-propanediol, 1,4-butandiol, 1,3-butanediol, 1,1,1-trimethylol propane, 1,4-bis(hydroxymethyl)-cyclohexane, 1,6-hexanediol, 2,2-bis(4-hydroxyphenyl) propane, 2,2-bis(4-hydroxycyclohexyl) propane, 2,3-dibromo-1,4-butenediol, and the like, and mixtures thereof.

The essentially hydrocarbon polyisocyanates which are useful in preparing the prepolymers employed in this invention are aromatic types wherein the isocyanate groups are directly attached to aromatic groups such as benzene or naphthalene rings. In one aspect the invention is concerned with prepolymers made from diisocyanates containing a substantial amount of diisocyanate in which the isocyanate groups are on different aromatic rings in given molecules. The polyisocyanates can contain non-interfering groups, e.g., aliphatic hydrocarbon radicals such as lower alkyl or other groups, having substantially non-reactive hydrogens as determined by the Zerewitinoff test, *J. Am. Chem. Soc.*, 44 3181 (1927). The polyisocyanate has at least 8 carbon atoms and usually does not have more than about 40 carbon atoms. Diisocyanates of about 6 to 20 carbon atoms in the hydrocarbon group are preferred. Suitable diisocyanates include benzene diisocyanate, toluene-2,4-diisocyanate, toluene-2,6-diisocyanate, diphenylmethane diisocyanates, e.g. diphenylmethane-4,4'-diisocyanate and diphenylmethane-2,4'-diisocyanate, xylene diisocyanate, naphthalene-1,5-diisocyanate and the like, or mixtures of two or more diisocyanates. The polyisocyanate component used to form the prepolymers may contain a portion of polyisocyanates having more than two isocyanate groups per molecule, providing the prepolymer compositions are not unduly deleteriously affected.

The polyurethane prepolymer reaction products employed in the present invention can be made by combining an excess of diisocyanate with the active hydrogen-containing reactant component. Alternatively, the diisocyanate can be reacted with part or all of one or more of the active hydrogen-containing reactant prior to the reaction with remaining portion of these materials. Stepwise mixing of the diisocyanate with the other reactant component may be used to enhance temperature control and/or produce a block copolymer rather than a random copolymer. The reaction temperatures for making the various prepolymers are often up to about 90° C., with about 20° to 80° C. being preferred. The reaction is preferably continued until there is little, if any, unreacted active hydrogen functionality remaining. Preferably the ratio of equivalents of isocyanate to active hydrogen-containing groups should be in the range of about 1.1/1 to 1.9/1, and more preferably should be in the range of about 1.2/1 to 1.5/1. Preferably, the free isocyanate content of the prepolymer is about 1 to 5 percent of the prepolymer solids, and more preferably about 2 to 5 percent of the prepolymer solids. The reaction may be conducted in the presence of a catalyst such as organo-tin compounds, tertiary amines, and the like; however, this is generally not necessary or desirable due to gel formation, and it is often preferred to conduct the reaction without a catalyst. As noted above, variations in the nature and amounts of the active hydrogen-containing component used in the preparation of the compositions of this invention can be made to provide polymers exhibiting desired characteristics.

The prepolymers can be prepared in the presence of a solvent which is essentially inert to the reaction. The solvents are generally organic and may be comprised essentially of carbon and hydrogen with other elements such as oxygen or nitrogen. While it may not be necessary to employ a solvent during formation of the urethane prepolymer, the use of a solvent may be desirable to maintain the reactants in the liquid state as well as permit better temperature control during the reaction by serving as a heat sink and, if desired, as a refluxing medium. The solvent employed should not contain active hydrogen as determined by the Zerewitinoff test. Solvents which may be employed include dimethylformamide, esters, ethers, keto-esters, ketones, e.g., butanone and propanone, glycol-ether-esters, pyrrolidones, e.g., N-methyl pyrrolidones, hydrogenated furans, and the like, and mixtures thereof. The amount of solvent employed, if any, can vary widely. Often about 0.01 to 10 parts by weight of solvent, preferably about 0.02 to 2 parts by weight of solvent, per part by weight of the total diisocyanate and active hydrogen-containing reactant in the prepolymer can be used. The presence of a solvent, however, is not necessary to provide a stable, infinitely-dilutable aqueous dispersion. Often, when solvent is employed during the preparation of the prepolymer and/or its polyamine-extended polymer, it is desirable to remove at least a portion of the solvent from the aqueous dispersion of polymer. Advantageously, the solvent to be removed from the dispersion has a lower boiling point than water and thus can be removed from the dispersion by, for example, distillation. The removal of the low boiling solvent is desirably conducted under conditions which are not deleterious to the polymer such as vacuum distillation or thin film evaporation conditions. A solvent having a higher boiling point than water such as dimethylformamide, N-methylpyrrolidone, and the like, which is a solvent for the polymer may be employed, in which case, the higher boiling solvent may be retained in the aqueous dispersion of polymer to enhance the coalescence of the polymer particles during film formation.

Oximes which can be used to block the isocyanate groups of the prepolymer may be of the formula R—CR'=NOH, wherein R and R' may be hydrocarbyl groups or hydrogen. The oxime may be an aldoxime of the general typ R—CH=N—OH, where R is a hydrocarbyl group or hydrogen, such as formaldoxime, acetaldoxime, propionaldoxime, butyraldoxime, benzaldoxime and the like. Also, the oxime may be a ketoxime of the general type

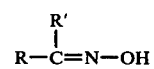

where R and R' are hydrocarbyl groups. Examples of such oximes include acetoxime (R=R'=CH$_3$), butanone oxime (R=CH$_3$, R'=C$_2$H$_5$), acetophenone oxime (R=C$_6$H$_5$, R'=CH$_3$) and the like. Also, oximes derived from alicyclic ketones may be used such as cyclohexanoneoxime. Thus, the R and R' groups, if not hydrogen, may have 1 to about 12 or more carbon atoms preferably 1 to about 6 carbon atoms. These groups may be aliphatic such as lower alkyl, say of 1 to about 4 or 6 carbon atoms, cycloalkyl of about 5 to 10 carbon atoms, aryl of 6 to about 12 carbon atoms, or mixed groups of such types.

The blocking agent ultimately becomes part of the solvent during polyamine extension so the agent should be soluble in water to the extent that it will not phase separate from the coating solution. In addition, since the urea-urethane and polyurea polymers are primarily designed to be used as coatings, it is preferred to use a blocking agent which may be volatile enough to be readily removed during the evaporation from the coating of the water and any cosolvents during curing of the coating. This makes low molecular weight oximes such as acetoxime, butanone oxime, butyraldoxime and the like, the preferred blocking agents.

The blocked, aromatic isocyanate prepolymers of this invention contain carboxylic groups. In making the aqueous dispersions of the present invention at least a portion of these groups are reacted with an alkaline material, especially amines having at least one salt-forming tertiary amine group, e.g., aliphatic tertiary amine groups, preferably a trialkyl amine, having 3 to about 12 carbon atoms, such as trimethylamine, triethylamine, metyldiethylamine, N,N-dimethylethanolamine, tripropylamine, triethylenediamine, and the like. The quaternary ammonium hydroxides are also among the useful salt-forming materials, and are exemplified by the tetraalkyl ammonium hydroxides in which the alkyl groups may be, for example, lower alkyl. The alkyl groups of the amine may be substituted with, for instance, hydroxy groups, as in the alkanolamines such as the dialkylmonoalkanol amines, alkyldialkanol amines and trialkanol amines, Triethylamine, tetramethyl ammonium hydroxide and N,N-dimethylethanol amine are among the useful amines. Desirably, the tertiary amine employed is relatively volatile. The tertiary amines or quaternary ammonium hydroxides react to form quaternary ammonium salts of the carboxylic acid groups of the polymer which salts, due to their ionic nature, are generally more hydrophilic than the free acid groups. The quaternary ammonium salts of the carboxylic acids of the blocked, aromatic isocyanate prepolymer, and the urea-urethanes and polyureas made therefrom are preferably capable of decomposing during the formation of, e.g., coatings of the polymers of this invention, and the tertiary amine or quaternary ammonium hydroxide may be volatilized and removed from the coating.

The carboxylic acid salt groups in the polymers of the invention are provided in amounts such that the aqueous, neutralized polymer dispersion is essentially infinitely dilutable with water. The salt-forming groups are, therefore, generally provided in a mole ratio to the carboxylic groups of the prepolymer of about 0.5:1 to 1.3:1, preferably about 0.8:1 to 1.0:1. The salt groups of the polymer may be other than tertiary amine or quaternary ammonium salt groups, such as alkali metal salt groups, e.g., the lithium, sodium, and/or potassium salts. Preferably, salt groups other than tertiary amine or quaternary ammonium salt groups are a minor amount of the total salt groups on a molar salt basis. Polymer films containing unduly large amounts of alkali metal salts are generally less water resistant than films prepared from polymer dispersions of more highly tertiary amine or quaternary ammonium-neutralized polymers. Therefore, it is preferred that if the polymer contains alkali metal salt groups, they should not be in amounts sufficient to unduly detract from the properties of the ultimate film.

The neutalizing salt-forminng group may, for instance, be reacted with blocked, prepolymers having free carboxylic groups. The salt-forming component can be combined with the blocked prepolymer and a sufficient amount of water to form a dispersion of the neutralized, blocked prepolymer in the water. Although the water may conveniently be added in admixture with the salt-forming component, it is preferred that the salt-forming component be combined with the blocked prepolymer before the addition of water. Frequently, the water is provided in a weight ratio to blocked, prepolymer solids of about 0.2:1 to 5:1, preferably about 0.5:1 to 3:1, on a total weight basis. A solvent for the blocked prepolymer may also be present when the salt-forming group or the water is added, to provide a viscosity suitable to facilitate the addition. Advantageously, the solvent is water-miscible and at least a portion of the solvent is low boiling, i.e., has a lower boiling point than water. Often, the solvent may be provided in a weight ratio to the prepolymer of at least about 1:5, and generally for economic reasons the weight ratio of the solvent to the prepolymer is less than about 5:1.

The reaction between the salt-forming component and the carboxylic acid groups of the blocked aromatic isocyanate prepolymer may occur at ambient temperature; however, lower or elevated temperatures of, e.g., about 15° to 80° C. may conveniently be employed. The blocked prepolymer mixture can advantageously be agitated and the addition of the salt-forming component and water conducted over a period of time, e.g., intermittently or continuously for about 0.5 to 120 minutes, e.g., either rapidly or slowly, depending on the rate at which it is convenient to add water. If the water, or a portion of the water, of the dispersion is added after the salt-forming component, the prepolymer mixture is advantageously agitated during such water addition to assist in providing the dispersion of the blocked prepolymer in the aqueous mixture.

The polyamines which are employed to provide the urea-urethane and polyurea products of this invention by chain-extension of the prepolymers can be selected from a variety of suitable polyamines. The polyamine chain-extension of the blocked, aromatic urethane prepolymer salts of the present invention can be accomplished by reacting an aqueous dispersion of the salt and polymer with polyamine, often with the addition of a further amount of water. The polyamine may be either hydrazine or an essentially aliphatic or cycloaliphatic hydrocarbon polyamine having at least 2 amine groups providing reactive hydrogens in accordance with the Zerewitinoff test, e.g., primary and secondary amine groups, and having 1 to about 40 or more carbon atoms, preferably about 2 to 15 carbon atoms. Preferably, the polyamine has at least 2 primary amine groups. The polyamine may contain other substituents, e.g., hydroxyl groups, which do not have hydrogen atoms as reactive with isocyanate groups as the primary or secondary amine groups. Among the useful polyamines are hydrazine, ethylenediamine, 1,2-propylenediamine, piperazine, 1,4-bis(aminomethyl)cyclohexane, hexamethylenediamine, trimethylhexamethylenediamine, methanediamine, 4,4'-diaminodicyclohexylmethane, diethylenetriamine, etc. Preferred polyamines are 1-amino-3-aminomethyl-3,5,5-trimethylcyclohexane, diethylenetriamine, and the like. The blocked prepolymer can be reacted with one or more of the polyamines to obtain the chain-extended products. Also, the foregoing polyamines may be used as active hydrogen-containing reactants in preparing the isocyanate group-terminated prepolymers.

Products of this invention may be made by chain extension of the prepolymers with polyamine containing three or more isocyanate-reactive amine groups per molecule, for instance, containing triamine or both triamine and diamine. Enough of the amine having a greater amine hydrogen functionality than two may be present in the chain-extending polyamine to provide an average of substantially more than 2, e.g., at least about 2.2, amine nitrogen atoms having active hydrogen per molecule of polyamine reacted. Advantageously, the average active amine hydrogen functionality of the polyamine mixture may range between about 2.2 to 2.8 or 3 amine nitrogen atoms having active hydrogen per molecule of polyamine, and may be about 2.3 or 2.4 to 2.6. The use of polyamines having a functionality greater than two has been found to increase the solvent resistance of coatings made from the polyamine-extended, aqueous dispersions of the invention when the prepolymer component contains reacted polyether polyol.

In the polyamine extension reaction the amounts of the blocked, aromatic prepolymer and polyamine reactants and the reaction conditions are generally chosen such that a substantial amount, e.g. the majority, of the blocked isocyanate content of the prepolymer is reacted with the primary or secondary amine groups. In practice, it is preferable to react at least about 80%, more preferably at least about 90%, of the blocked isocyanate groups with the polyamine. Thus, an approximately stoichiometric amount of amine or slightly less is used. It is preferred that the polyamine not be in an unduly large excess in the presence of the blocked prepolymer since a lower molecular weight urea-urethane or polyurea polymer may be formed which is less desirable.

The chain extension can be conducted at elevated temperatures, say at least about 50° C. The temperature may, for instance, be up to about 95° C. or more, preferably from about 60° C. to about 80° C. Elevated or reduced pressures may be employed; however, the chain extension reaction is normally conducted at approximately ambient pressure. Generally it is desired to continue the reaction until a good yield of the desired polymer is obtained. A period of 6 to 18 hours at 70° C. may be required to achieve substantially complete reaction.

The polyamine is preferably gradually added to the reaction medium which contains the blocked prepolymer salt in order to prevent the occurrence of localized high concentrations of the added reactant which may lead to forming polymers having an unduly broad molecular weight range. When employing high concentrations of the reactants in the reaction medium, it is preferred that the combination of the polyamine and blocked prepolymer salt be less rapid than when the reactants are less concentrated. For instance, when the reactants are in relatively low concentration in the reaction medium and the medium is well agitated, the polyamine and blocked prepolymer salt can be quickly combined. Frequently, the addition of the polyamine will be over a period of about 0.5 to 30 minutes. The rate of addition of the polyamine may, in part, depend upon the degree of agitation of the reaction medium and the speed with which the polyamine is dissipated in the reaction medum. The polyamine may be added in essentially undiluted form or in admixture with an organic solvent or with water. The polyamine may be added in an essentially aqueous solution or there may be sequential addition of polyamine and water. A convenient weight ratio of water or other solvent to polyamine may be added, and often the weight ratio of total water or other solent to polyamine is about 1:1 to 5:1.

The urea-urethane or polyurea polymer may have cross-linking and still form a continuous film under normal curing conditions. An unduly large amount of cross-linking, however, may be undesirable since the polymer particles may be too stiff to form a continuous film under normal curing conditions. The cross-linking of the polymers can be provided by the use of either or both of an at least trifunctional prepolymer or an at least trifunctional polyamine for chain extension. The trifunctional or higher prepolymers may be produced from a trifunctional or correspondingly higher polyol or polyamine and/or polyisocyanate during the formation of the prepolymer. Often, the cross-linking materials are aliphatic and have about 3 to 12, preferably about 3 to 6, carbon atoms, per molecule, although their polyether or polyester derivatives may have significantly higher molecular weights.

It is generally preferred, however, that any trifunctional or higher component be provided at least to a major extent by the polyamine since excessively cross-linked prepolymers may be highly viscous and require excessive amounts of solvent to provide a solution of desirable viscosity for further processing or may form an intractable gel which is unsuitable for further processing. A preferred trifunctional polyamine is diethylene triamine.

The stable polymer dispersions which are formed in accordance with the present invention may be emulsions or other dispersions having a lower particle size range. Thus the solids may have an average colloidal particle size up to about 0.1 micron or may be in the typical emulsion size range of about 0.5 or 1 micron. However, regardless of particle size, the dispersions have excellent freeze-thaw stability, e.g., not gelling upon freezing; this is an outstanding practical advantage over many commercially available emulsions which gel upon freezing. The polymer dispersions of this invention are essentially infinitely dilutable in aqueous media in the absence of an extraneous emulsifying agent and often even in the absence of a cosolvent.

The chain-extended polymers of this invention are advantageously employed as aqueous coating compositions on solid substrates. Frequently, the aqueous compositions have a relatively neutral pH, say, about 6 to 11, preferably about 7 to 9.5. The coating compositions may contain ingredients other than water and the polymer, such as a higher boiling, e.g., slower evaporating than water, solvent for the polymer, particularly solvents which may be miscible with water such a dimethyl formamide, N-methylpyrrolidone, alkoxyalkanols, alkyl diethers, and carboxylic esters derived from alkoxyalkanols. The higher boiling solvent is advantageously provided in a minor amount sufficient to aid the coalescence of the polymer particles after the bulk of the water has been evaporated. Essentially complete coalescence of the polymer particles tends to provide desirably glossy finishes and enhance physical properties, e.g., strength of the film. Frequently, the slower evaporating solvent is provided in a weight ratio to polymer solids of up to about 1:2, preferably about 1:3. The slower evaporating solvent may be introduced during the formation of the prepolymer, or it can be added to the aqueous dispersion of the chain-extended polymer.

The compositions of the invention may contain other ingredients for coating compositions including plasticizers to modify the properties of the resultant polymers, pigments, colorants, dyes, emulsifying agents, surfactants, thickeners, heat stabilizers, antioxidants, levelling agents, anti-cratering agents, fillers, sedimentation inhibitors, ultraviolet-light absorbers, and the like. The additives such as heat stabilizers, ultraviolet-light absorbers, etc., may be intimately dispersed in the reaction mixture and apparently thereby become an integral part of each individual polymer particle when formed. Alternatively, the additive may be introduced after the chain-extended polymer has been formed, in which case the additive can be incorporated on the surface of the polymer or dispersed in the aqueous medium.

The urea-urethane and polyurea polymers of this invention, including the higher molecular weight polymers, can comprise a large amount of the aqueous composition without the composition having an undesirably high viscosity, and the viscosity of the aqueous dispersion may be lower than that of analogous polymers dissolved in organic solvents. The non-volatile content of the coating compositions of this invention may often range from about 5 to 40, preferably about 30 to 40 weight percent of the composition. The non-volatile content of the compositions may vary depending upon the nature of the coating and the manner in which the coating is to be applied, e.g., by spraying, brushing, transfer coating, etc. Since the aqueous compositions are infinitely dilutable with water, water can be employed to thin the compositions, and the washing of application equipment and spatterings is facilitated.

The urea-urethane and polyurea polymers of this invention can also be used in applications other than coatings, e.g., in casting to form thin films, as adhesives, and the like. The film-type products generally have a thickness of up to about 100 mils or more, and often the coating compositions have a thickness of up to about 10 mils. The polymers can be formed into various materials or articles of greater cross-sectional dimensions, and can be employed in the various ways known in the art for utilization of these types of materials. The coatings, due to the use of water in the compositions, can be dried at temperatures of, say, about 10° C. or more. Advantageously, relatively low temperatures can be employed, however, elevated temperatures may also be used, e.g., temperatures of up to about 150° C. or more to accelerate removal of water and organic solvent, if present.

The invention will be illustrated further by the following examples. All parts and percentages are by weight unless otherwise indicated.

EXAMPLE 1

A. Preparation of Prepolymer

A mixture of one thousand parts of poly(oxypropylene)glycol (2000 molecular weight), 144.2 parts of cyclohexanedimethanol, 134.15 parts of dimethylolpropionic acid, 5.2 parts of antioixidant Irganox 1076, 5.2 parts of antioxidant diphenylisodecylphosphite was heated in vacuo for 20 minutes at 100° C. to remove moisture. After cooling to 75° C. under a dry nitrogen atmosphere, 800 parts of N-methylpyrrolidone was added. After cooling this solution to 21° C., a solution at 40° C. of 800.8 parts of 4,4'-diphenylmethanediisocyanate in 325 parts of N-methylpyrrolidone was added over a 5 minute interval with cooling using a mixture of ice and water. At the end of the addition the temperature was 57° C. After holding for 15 minutes with ice-water cooling the temperature was 56° C.; at this point the cooling bath was removed. After 90 minutes heat was applied and within 1 hour the temperature rose from 50° C. to 87° C. At this point, the reaction vessel was cooled with cold water. Upon cooling to 70° C. the NCO content was 1.48% (80% of theory), acid value 17.82 (101% of theory), Gardner color 1-; viscosity at 25° C. 1,426 stokes.

B. Preparation of the Fully Polymerized Aqueous Polyurethane Ionomer Solution One thousand parts of the prepolymer from part A was charged to a reaction flask at 50° C. With good stirring 32.23 parts of butanone oxime (105% of theory) was added which caused an exotherm to 69° C. in three minutes. Then 26.84 parts of triethylamine (85% of theory) was added and the solution was stirred for 2 minutes at 69° C. Then one thousand and one hundred parts of water at 25° C. was added over a 2 minute interval; the dispersion was then at 45° C. The heater was turned on and a solution at 25° C. of 29.95 parts of isophoronediamine and 77.48 parts of water was added. After holding at 70° C. for 12.5 hours the amine value of 7.32 corresponded to 92% reaction. The resulting milky, opaque solution contained 30.32% NV, had a viscosity of 0.34 stoke and a pH of 7.6.

The physical properties of a dry film of the polymer are: 100% modulus 2862 psi, 200% modulus 4308 psi, tensile strength 6352 psi at 275% elongation, Sward hardness 20, Shore D hardness 48, split tear strength 106 lbs./inch., Die C tear strength 631 lbs./inch. The polymer film had excellent resistance to water, xylene and perchloroethylene, but poor resistance to ethanol or butanone. The polymer adheres to thermoplastic urethane (TPU) elastomer and to "RIM" urethane foam.

The polymer solution froze upon cooling to −50° C. and melted upon rewarming to 25° C. without any gel being produced. This freezing-thawing was found to be without effect after a total of 10 cycles.

EXAMPLE 2

A. Preparation of Prepolymer

A mixture of 800 parts of poly (oxytetramethylene) glycol (2044 molecular weight), 115.4 parts of 1,4-bis(-hydroxymethyl)-cyclohexane, 107.3 parts of dimethylolpropionic acid, 4.2 parts of antioxidant Irganox 1076 and 4.2 parts of diphenylisodecyl phosphite was heated in vacuo for 20 minutes at 100° C. to remove moisture. After cooling to 80° C. under a dry nitrogen atmosphere, 600.1 parts of N-methylpyrrolidone was added. After cooling this solution to 15° C., a solution at 27° C. of 640.6 parts of 4,4'-diphenylmethanediisocyanate in 300 parts of N-methylpyrrolidone was added all at once with cooling using a mixture of water and ice. Three minutes later the temperature reached 32° C., 12 minutes after the addition the cooling bath was removed when the reaction temperature was 53° C. Seventeen minutes later the temperature was 55° C. and a sample analyzed for NCO content contained 1.64% (88% of theory); acid value 18.27 (104% of theory), viscosity 1,350 poises at 25° C.

B. Preparation of the Fully Polymerized Aqueous Polyurethane Ionomer Solution One thousand parts of the prepolymer from part A was charged to a reaction flask at 50° C. With good stirring, 35.72 parts (105% of theory) of butanone oxime was added which caused an exotherm to about 65° C. Then 26.84 parts (85% of theory) of triethylamine was added with good stirring. To this was added 1000 parts of water at 25° C. To the resulting dispersion was added a solution at 25° C. of 33.19 parts (100% of theory) of isophoronediamine and 108.09 parts of water. Then the mixture was rapidly heated to 70° C. and held at 70° C. for 10 hours with good stirring and then cooled to 25° C. with good stirring. The resulting milky liquid had an amine value of 7.76 which corresponded to 90% reaction of the isophoronediamine. The pH was 8.12, the viscosity was 0.50 stoke and the liquid contained 31.06% NV. It did not gel upon repeated freeze-thaw cycles. The physical properties of a dry film of the polymer are: yield point 2774 psi at 10% elongation, 50% modulus 2686 psi, 100% modulus 3004 psi, 200% modulus 4044 psi, 300% modulus 7152 psi, tensile strength 8130 psi at 322% elongation, Sward hardness 36, Shore D hardness 55, split tear strength 260 lbs./inch, Die C tear strength 674 lbs./inch. The solvent resistance was the same as in Example 1.

EXAMPLE 3

A. Preparation of Prepolymer

A mixture of 800 parts of poly(neopentylglycol-1,6-hexandiol adipate) glycol (2022 molecular weight), 115.4 parts of 1,4-bis(hydroxymethyl)-cyclohexane, 107.3 parts of dimethylolpropionic acid, 4.2 parts of Irganox 1076 and 4.2 parts of diphenylisodecylphosphite was heated in vacuo for 20 minutes at 100° C. to remove moisture. After cooling to 70° C., 600.1 parts of N-methylpyrrolidone was added. After cooling this solution to 18° C., a solution at 32° C. of 640.6 parts of 4,4'-diphenylmethanediisocyanate in 300 parts of N-methylpyrrolidone was added all at once with cooling. After the exotherm was completed the prepolymer contained 1.47% NCO (80% of theory); acid value 18.09 (104% of theory), viscosity 3,088 poises at 25° C.

B. Preparation of the Fully Polymerized Aqueous Polyurethane Ionomer Solution One thousand parts of the prepolymer from part A was charged to a reaction flask at 50° C. With good stirring, 32.01 parts (105% of theory) of butanone oxime was added. After the exotherm, 27.68 parts (85% of theory) of triethylamine was added. To this was added 1000 parts of water. After the prepolymer was emulsified by stirring, a solution at 25° C. of 29.75 parts (100% of theory) of isophoronediamine and 99.43 parts of water was quickly added and the resulting mixture was rapidly heated to 70° C.

After stirring well for 13 hours at 70° C., the mixture was cooled to 25° C. with stirring. The resulting liquid had an amine value of 6.8 (100% reaction of the diamine should have given an amine value of 7.0). The pH was 7.70, the viscosity was 0.34 stoke and the liquid contained 31.04% NV. The dispersion did not gel upon repeated freeze-thaw cycles. The physical properties of a dry film of the polymer are: yield point 3376 psi at 10% elongation, 50% modulus 3490 psi, 100% modulus 3870 psi, 200% modulus 5498 psi, tensile strength 6857 psi at 250% elongation, Sward hardness 30, Shore D hardness 45, split tear strength 314 lbs./inch, Die C tear strength 823 lbs./inch. The polymer's resistance was excellent towards water, xylene and perchloroethylene, but only fair towards ethanol and poor toward butanone. The polymer adheres to ABS plastic.

EXAMPLE 4

A. Preparation of Prepolymer

A mixture of 1,680 parts of poly(1,6-hexanedioladipate)diol (2000 molecular weight), 155.6 parts of dimethylolpropionic acid, 6.2 parts of Irganox 1076, 6.2 parts of diphenylisodecylphosphite and 670 parts of N-methylpyrrolidone was heated to 80° C. to achieve a uniform solution and then cooled to 35° C. A solution at 33° C. of 640.6 parts of 4,4'-diphenylmethanediisocyanate in 670 parts of N-methylpyrrolidone was then added rapidly with cooling. After reaching a maximum temperature of 56° C. the mixture was cooled to 25° C. The prepolymer was a solid at 25° C. and contained 1.72% NCO (91% of theory) on a 100% NV basis and had an acid value of 26.0 (99% of theory) on a 100% NV basis.

B. Preparation of a Fully Polymerized Aqueous Polyurethane Ionomer Solution One thousand parts of the prepolymer from part A was melted by heating to 60° C. and was charged to a reaction flask. After cooling it to 47° C., 25.48 parts (105% of theory) of butanone oxime added with good stirring; the exotherm brought the temperature to 56° C. Then 26.13 parts (87% of theory) of triethylamine was added. To this was added 1000 parts of water with good mixing to obtain an emulsion at 39° C. Then a solution of 23.68 parts (100% of theory) of isophoronediamine and 170.3 parts of water was quickly added with stirring and the resulting mixture was rapidly heated to 70° C. and held at 70° C. for 24 hours. After cooling to 25° C. with stirring, the liquid contained 30.29% NV and had a viscosity of 0.9 stoke; its pH was 7.85 and amine value was 7.9.

The liquid could be repeatedly frozen and melted without forming gel. The physical properties of a dry film of the polymer are: 50% modulus 442 psi, 100% modulus 514 psi, 200% modulus 858 psi, 300% modulus 1838 psi, tensile strength 4866 psi at 488% elongation, Sward hardness 10, Shore D hardness 25, Shore A hardness 70, split tear strength 210 lbs./inch, Die C tear strength 317 lbs./inch. The film had excellent resistance to water, xylene and perchloroethylene, but only poor resistance to ethanol or butanone.

C. Preparation of a Fully Polymerized Aqueous Polyurethane Ionomer Solution One thousand parts of the prepolymer from part A was melted at 70° C. and placed in a reaction flask. After cooling to 52° C., 25.48 parts (105% of theory) of butanone oxime was added with good stirring, followed by 26.13 parts (85% of theory) of triethylamine and then 1000 parts of water. The resulting dispersion at 40° C. was treated with a solution of 11.84 parts (50% of theory) of isophoronediamine, 4.78 parts of diethylenetriamine (50% of theory) and 153.8 parts of water with good stirring and quickly heated to 70° C. After 24 hours of stirring at 70° C. the liquid was cooled to 25° C. with stirring. The resulting liquid contained 30.06% NV and had a viscosity of 2.9 stokes; its pH was 7.68 and the amine value was 8.14. The liquid did not form gel on repeated freeze-thaw cycles. The physical properties of a dry film of the polymer are: 50% modulus 406 psi, 100% modulus 505 psi, 200% modulus 970 psi, 300% modulus 2188 psi, tensile strength 6257 psi at 475% elongation, Sward hardness 6, Shore D hardness 20, Shore A hardness 65, split tear strength 233 lbs./inch, Die C tear strength 308 lbs./inch. Solvent resistance was the same as the polymer in part B.

EXAMPLE 5

A. Preparation of Prepolymer

A mixture of 1,680 parts of poly(oxy-1,2-propylene) glycol, 2000 molecular weight (Union Carbide's PPG 2025), 155.6 parts of dimethylolpropionic acid, 6 parts of Irganox 1076, 6 parts of diphenylisodecylphosphite and 766.4 parts of butanone was heated at 70° C. for 1 hour and cooled to 22° C. To this well-stirred mixture was added a solution at 30° C. of 640.6 parts of 4,4'-diphenylmethanediisocyanate in 300 parts of butanone. The mixture exothermed to 40° C. After heated to 70° C. the solution was held 2 hours at 70° C. and then cooled to 25° C. The solution contained 70% of the expected NCO content and 101% of the expected acidity; due to evaporative loss of some of the butanone during reaction the NV content was 73% instead of the expected 70%; the viscosity was 136.5 stokes and the Gardner color was less than 1.

B. Preparation of the Fully Polymerized Aqueous Polyurethane Ionomer Solution One thousand parts of prepolymer from part A was adjusted to 26° C. and charged to a reaction flask. Then, the following items were added in sequence with good stirring: 20.91 parts (105% of theory) of butanone oxime, 29.51 parts (85% of theory) of triethylamine, 1,350 parts of water and finally a solution of 19.43 parts (100% of theory) of isophoronediamine and 78.25 parts of water. The mixture was quickly heated to 70° C. and held at 70° C. for 7 hours and then cooled to 25° C. The resulting milky liquid contained 30.25% NV as a colloidal dispersion and had a viscosity of 19.0 stokes, a pH of 8.0 and an amine value of 7.24 which corresponded to 86% completion of the diamine chain extension. The physical properties of a dry film of the polymer are: 50% modulus 197 psi, 100% modulus 266 psi, 200% modulus 374 psi, 300% modulus 503 psi, 500% modulus 986 psi, 700% modulus 2424 psi, tensile strength 2995 psi at 742% elongation, Sward hardness 2, Shore A hardness 65, Shore D hardness 20, split tear strength 77 lbs./inch, Die C tear strength 126 lbs./inch. A film of the polymer had excellent resistance to xylene and perchloroethylene, very good water resistance and poor resistance to ethanol and butanone.

EXAMPLE 6

A. Preparation of Prepolymer

A mixture of 1,800 parts of poly(oxy-1,2-propylene) glycol, 2000 molecular weight (Union Carbide's PPG 2025), 211.2 parts of dimethylolpropionic acid, 292.0 parts of 1,4-bis(hydroxymethyl)-cyclohexane and 8.3 parts of Irganox 1076 was heated in vacuo for 15 minutes at 100° C. to remove moisture. Then dry nitrogen was used to bring the mixture to atmospheric pressure. To the above blend was added 8.3 parts of diphenylisodecylphosphite and 830.7 parts of N-methyl-pyrrolidone. After stirring for one hour to achieve complete solution, the liquid was cooled to 23° C. To this solution was added 1003.1 parts of toluene diisocyanate (an 80/20 blend of the 2,4- and 2,6-isomers) all at once with good stirring. Within 4 minutes the temperature reached 87° C. at which time the flask was cooled with a water bath. A maximum temperature of 90° C. was reached 1 minute later; 5 minutes after reaching 90° C. the temperature was reduced to 85° C. at which point the cooling bath was removed and the flask was heated to maintain the 85° C. temperature for 2 hours. At this point, with an NCO content of 2.48% (96% of theory), the solution was cooled to 25° C. The prepolymer contained 92% of the expected NCO content and 101% of the expected acidity; its viscosity was 3,472 poises and its Gardner color was less than 1.

B. Preparation of the Fully Polymerized Aqueous Polyurethane Ionomer Solution One thousand parts of the prepolymer from part A was charged to a reaction flask at 25° C. To this, with good stirring, was added 153.1 parts of N-methylpyrrolidone. After heating to 50° C. and stirring until homogeneous, the solution was treated with 51.62 parts (105% of theory) of butanone oxime; the exotherm brought the temperature to 60° C. Then 33 parts (85% of theory) of triethylamine was added followed by 1,300 parts of water at 25° C. The resulting emulsion at 45° C. was then treated rapidly with good stirring with a solution at 25° C. of 47.96 parts (100% of theory) of isophoronediamine and 149.6 parts of water. After 18 minutes of heating and stirring the temperature was brought to 70° C. The mixture was held at 70° C. for 3.7 hours and then cooled to 25° C. with stirring. The white emulsion contained 31.80% NV, had a specific gravity of 1.05, a viscosity of 0.4 stoke, a pH of 7.40 and an amine value of 8.02. The solvent vapors extinguished a flame when the emulsion was heated. After 10 freeze-thaw cycles, the emulsion was free of gel. The physical properties of a dry film of the polymer are: 50% modulus 1458 psi, 100% modulus 1858 psi, 200% modulus 2694 psi, 300% modulus 3867 psi, tensile strength 5792 psi at 414% elongation, Sward hardness 14, Shore D hardness 45, split tear strength 237 lbs./inch, Die C tear strength 469 lbs./inch. A film of the polymer had excellent resistance to xylene and perchloroethylene, very good resistance to water and poor resistance to ethanol and butanone. A film of the polymer had good adhesion to wood, thermoplastic urethane molding compound, ABS plactic, RIM foam, polycarbonate molding compound, and fiberglass reinforced polyester molding compound.

EXAMPLE 7

A. Preparation of Prepolymer

Using the same ratios of reactive ingredients and antioxidants and the same general procedure as in part A of Example 6, enough N-methylpyrrolidone was used to give a prepolymer at 64.64% NV which contained 1.72% NCO (85% of theory) and had an acid value of 17.87 (105% of theory); its viscosity was 88.1 stokes at 25° C. and the Gardner color was less than 1.

B. Preparation of the Fully Polymerized Aqueous Polyurethane Ionomer Solution Using the same procedure as in part B of Example 6, 1,000 parts of prepolymer from part A, 37.46 parts (105% of theory) of butanone oxime, 27.34 parts (85% of theory) of triethylamine, 1,000 parts of water and a solution of 12.06 parts (100% of theory) of 54.4% aqueous hydrazine and 47.20 parts of water gave a liquid product containing 31.20% NV with a viscosity of 0.8 stoke, a pH of 7.50 and an amine value of 7.10 which corresponded to complete reaction of the hydrazine.

The physical properties of a dry film of the polymer are: 50% modulus 1010 psi, 100% modulus 1237 psi, 200% modulus 1584 psi, 300% modulus 1970 psi, tensile strength 3065 psi at 480% elongate, Sward hardness 10, Shore D hardness 40, split tear strength 367 lbs./inch, Die C tear strength 355 lbs./inch. A film of the polymer had good resistance to water, very good resistance to xylene and perchloroethylene and poor resistance to ethanol and butanone.

EXAMPLE 8

A. Preparation of Prepolymer

A mixture of 1,470 parts of poly(oxytetramethylene) glycol (2,044 molecular weight), 136.2 parts of dimethylolpropionic acid, 5.1 parts of Irganox 1076, 5.1 parts of diphenylisodecylphosphite and 883.4 parts of N-methylpyrrolidone was heated at 80° C. with stirring to achieve complete solution. After cooling to 22° C., 445 parts of toluene diisocyanate (an 80/20 blend of the 2,4- and 2,6-isomers) was added with good stirring all at once. After 9 minutes the temperature reached 59° C. and then increased only 1° C. more in the next 41 minutes. Then heat was applied to increase the temperature to 80° C. After 2 hours at 80° C. the prepolymer contained 88% of the expected NCO content; it was allowed to cool to 25° C. with stirring. It then contained 82% of the expected NCO content and 104% of the expected acidity.

B. Preparation of the Fully Polymerized Aqueous Polyurethane Ionomer Solution One thousand parts of the prepolymer from part A was placed in a reaction flask at 57° C. Then 44.87 parts (105% of theory) of butanone oxime was added with moderate cooling and good stirring which increased the temperature to 73° C. Then 29.73 parts (85% of theory) of triethylamine was added, followed by 1,300 parts of water at 25° C. with good mixing. The resulting emulsion at 47° C. was heated to 51° C. and a solution at 25° C. of 41.69 parts (100% of theory) of isophoronediamine and 56.01 parts of water was added with good stirring. The heating was continued 8 minutes until the mixture reached 70° C. and then the well-stirred mixture was held at 70° C. for 6 hours. The product was cooled to 25° C. with stirring; the milky liquid contained 30.21% NV, had a viscosity of 0.5 stoke, a pH of 7.50 and an amine value of 7.59. The physical properties of a dry film of the polymer are: 50% modulus 579 psi, 100% modulus 728 psi, 200% modulus 1131 psi, 300% modulus 2298 psi, tensile strength 6884 psi at 425% elongation, Sward hardness 4, Shore A hardness 75, Shore D hardness 30, split tear strength 334 lbs./inch, Die C tear strength 176 lbs./inch. A film of the polymer had excellent resistance to xylene and perchloroethylene, very good water resistance and poor resistance to ethanol and butanone.

EXAMPLE 9

A. Preparation of Prepolymer

A prepolymer using the same ratios of the same ingredients as in Example 2A was prepared by adding the polyol to the 4,4'-diphenylmethanediisocyanate solution and allowing the mixture to exotherm to 84° C. The next day at room temperature the prepolymer contained 2.0% NCO (71% of theory) on a 100% NV basis.

B. Preparation of a Fully Polymerized Aqueous Polyureaurethane Ionomer Solution 1,500 parts of the prepolymer from part A was melted at 70° C. and placed in a reaction flask. After cooling to 23° C., 44.49 parts (110% of theory) of butanone oxime was added with good stirring, followed by 41.92 parts (85% of theory) of triethylamine and then 1500 parts of water. The resulting dispersion at 34° C. was treated with a solution of 19.73 parts (50% of theory) of isophoronediamine, 7.96 parts of diethylenetriamine (50% of theory) and 120.4 parts of water with good stirring and quickly heated to 70° C. After 15 hours of stirring at 70° C. the liquid was cooled to 25° C. with stirring. The resulting liquid contained 30.17% NV and had a viscosity of 0.4 stoke; its pH was 8.05 and the amine value was 9.67. The liquid did not form gel on repeated freeze-thaw cycles. The physical properties of a dry film of the polymer are: yield point 2590 psi at 10% elongation, 50% modulus 2627 psi, 100% modulus 3036 psi, 200% modulus 4580 psi, tensile strength 7300 psi at 265% elongation, Sward hardness 20, Shore D hardness 53, split tear strength 36 lbs./inch, Die C tear strength 488 lbs./inch. Solvent resistance of the coating was excellent to ethanol, water, xylene and perchloroethylene, and was very good to butanone. This is in sharp contrast to the solvent resistance of the coatings in Example 2 in which the resistance to ethanol and butanone was poor.

It is claimed:

1. A stable, aqueous dispersion of carboxylic acid salt of polymer prepared by reaction of carboxylic group-containing oxime-blocked, isocyanate-terminated prepolymer and polyamine, said prepolymer being the reaction product of aromatic polyisocyanate and reactant having at least two isocyanate-reactive, active hydrogen-containing groups per molecule, said prepolymer having a carboxylic group which is relatively non-reactive with isocyanate groups, and said oxime-blocked isocyanate groups being capable of reacting with said polyamine at a temperature of less than about 95° C. within a time period of up to about 18 hours, and said polymer salt having sufficient carboxylic groups in salt form to provide stable, aqueous dispersion.

2. An aqueous dispersion of claim 1 wherein the carboxylic group content of said polymer in salt form is about 1.6 to 6 weight percent on a solids basis.

3. An aqueous dispersion of claim 1 wherein the polymer salt comprises tertiary amine, quaternary ammonium or alkali salt.

4. An aqueous dispersion of claim 1 wherein the oxime-blocked isocyanate groups of said prepolymer are capable of reacting with said polyamine at a temperature of from about 60° C. to about 80° C. within about 6 to 18 hours.

5. An aqueous dispersion of claim 1 wherein the carboxylic group of said polymer in salt form is about 1.3 to 6 weight percent on a solids basis and said polymer salt comprises tertiary amine salt and said polyamine comprises diamine.

6. An aqueous dispersion of claim 5 wherein the tertiary amine salt comprises triethylamine amine salt.

7. An aqueous dispersion of claim 4 wherein said prepolymer is prepared from polyol comprising dihydroxy alkanoic acid.

8. An aqueous dispersion of claim 7 wherein said dihydroxy alkanoic acid comprises α,α-dialkylol alkanoic acid.

9. An aqueous dispersion of claim 8 wherein the carboxylic group content of said polymer in salt form is about 1.6 to 6 weight percent on a solids basis, and said salt comprises tertiary amine salt.

10. An aqueous dispersion of claim 9 wherein the α,α-dialkylol alkanoic acid comprises 2,2-dimethylolpropionic acid.

11. An aqueous dispersion of claim 10 wherein the isocyanate-terminated prepolymer has an acid value of at least about 20 on an unneutralized solids basis.

12. An aqueous dispersion of claim 11 wherein said tertiary amine salt comprises triethylamine salt.

13. An aqueous dispersion of claim 1 wherein said aromatic polyisocyanate comprises diphenylmethane diisocyanate.

14. A stable, aqueous dispersion of urea-urethane polymer, said polymer consisting essentially of tertiary amine salt urea-urethane of polyamine comprising diamine and a tertiary amine salt of a carboxylic acid group-containing, oxime-blocked isocyanate-terminated, urethane prepolymer, said prepolymer being of aromatic diisocyanate and polyol comprising dihydroxy alkanoic acid and polyether or polyester polyol, said oxime-blocked isocyanate groups of said prepolymer being capable of reacting with said polyamine at a temperature of less than about 95° C. within a time period of up to about 18 hours, said tertiary amine salt content of said urea-urethane being sufficient to provide a stable, aqueous dispersion of said urea-urethane salt which is infinitely dilutable with water.

15. An aqueous dispersion of claim 14 wherein said aromatic diisocyanate comprises diphenylmethane-4,4'-diisocyanate.

16. An aqueous dispersion of claim 14 or 15 wherein said polyether or polyester polyol has a molecular weight of about 400 to 5,000 and comprises up to about 95 weight percent of said polyol comprising dihydroxy alkanoic acid and polyether or polyester polyol.

17. An aqueous dispersion of claim 16 wherein said dihydroxy alkanoic acid comprises α,α-dialkylol alkanoic acid.

18. An aqueous dispersion of claim 17 wherein the carboxylic group content of said urea-urethane in tertiary amine salt form is about 1.6 to 6 weight percent on a solids basis, and the isocyanate-terminated prepolymer has an acid value of about 20 to 75 on an unneutralized solids basis.

19. An aqueous dispersion of claim 18 wherein the α,α-dialkylol alkanoic acid comprises 2,2-dimethylolpropionic acid.

20. An aqueous dispersion of claim 19 wherein said tertiary amine salt comprises triethylamine salt.

21. An aqueous dispersion of claim 15 wherein the polyamine comprises 1-amino-3-aminomethyl-3,5,5-trimethylcyclohexane.

22. A method for making a stable, aqueous dispersion of polyamine-extended polymer salt which comprises adding salt-forming base and water to a carboxylic acid group-containing oxime-blocked, isocyanate-terminated prepolymer of aromatic polyisocyanate and reactant having at least two isocyanate-reactive, active hydrogen-containing groups per molecule, said prepolymer having a carboxylic group which is relatively non-reactive with isocyanate groups, to form an aqueous dispersion of prepolymer salt in water, reacting the prepolymer salt dispersion with polyamine at an elevated temperature of less than about 95° C. for a time period of up to about 18 hours to form said polyamine-extended polymer salt dispersion.

23. The method of claim 22 in which the aromatic polyisocyanate has isocyanate groups on different aromatic rings.

24. The method of claim 23 in which the aromatic diisocyanate comprises diphenylmethane diisocyanate.

25. A method of claim 21 or 24 wherein the weight ratio of prepolymer to water is about 0.2:1 to 5:1.

26. A method of claim 25 wherein the salt-forming base comprises tertiary amine, quaternary ammonium or alkali salt-forming base, and the prepolymer is dissolved in a water-miscible solvent when said base and water are added, said solvent being in an amount sufficient to provide a viscosity suitable to facilitate the addition of the base and water.

27. A method of claim 26 in which said solvent comprises N-methylpyrrolidone.

28. A method of claim 21 or 24 wherein the reactant having at least two isocyanate-reactive, active hydrogen-containing groups per molecule comprises α,α-dialkylol alkanoic acid.

29. A method of claim 28 wherein the α,α-dialkylol alkanoic acid comprises 2,2-dimethylolpropionic acid.

30. A method of claim 29 wherein said salt-forming base comprises tertiary amine.

31. A method of claim 29 wherein said reactant further comprises polyether or polyester polyol having a molecular weight of about 400 to 5,000 and said polyamine comprises diamine.

32. A method of claim 31 wherein said prepolymer salt dispersion is reacted with said polyamine at an elevated temperature of from about 60° C. to about 80° C. within a time period of from about 6 to about 18 hours.

33. A method of claim 31 wherein said elevated temperature is at least about 50° C.

34. A method of claim 33 wherein the α,α-dimethylol alkanoic acid comprises 2,2-dimethylolpropionic acid.

35. A method of claim 34 wherein said tertiary amine comprises triethylamine.

36. A method of claim 35 wherein said polyamine comprises 1-amino-3-aminomethyl-3,5,5-trimethylcyclohexane.

37. A method of claim 35 wherein the prepolymer is dissolved in a water-miscible solvent when said tertiary amine and water are added, said solvent being in an amount sufficient to provide a viscosity suitable to facilitate the addition of the tertiary amine and water.

38. A method of claim 37 in which said solvent comprises N-methylpyrrolidone.

39. A stable, aqueous dispersion of polymer salt, which polymer salt comprises carboxylic group-containing, oxime-blocked, isocyanate-terminated prepolymer comprising the reaction product of aromatic polyisocyanate and reactant having at least two isocyanate-reactive, active hydrogen-containing groups per molecule, said prepolymer having a carboxylic group which is relatively non-reactive with isocyanate groups, and said oxime-blocked isocyanate groups of said prepolymer being capable of reacting with a polyamine at a temperature of less than about 95° C. within a time period of up to about 18 hours, and said polymer salt having sufficient carboxylic groups in salt form to provide said stable, aqueous dispersion.

40. An aqueous dispersion of claim 39 wherein the carboyxlic group content of said polymer in salt form is about 1.6 to 6 weight percent on a solids basis.

41. An aqueous dispersion of claim 39 wherein the oxime-blocked isocyanate groups of said prepolymer are capable of reacting with a polyamine at a temperature of from about 60° C. to about 80° C. within a time period of about 6 to about 18 hours.

42. An aqueous dispersion of claim 39 wherein the salt comprises tertiary amine salt.

43. An aqueous dispersion of claim 42 wherein the tertiary amine salt comprises triethylamine amine salt.

44. An aqueous dispersion of claim 39 wherein said prepolymer is prepared from polyol comprising dihydroxy alkanoic acid.

45. An aqueous dispersion of claim 42 wherein said dihydroxy alkanoic acid comprises $\alpha,\alpha$-dialkylol alkanoic acid.

46. An aqueous dispersion of claim 43 wherein the prepolymer is oxime-blocked.

47. An aqueous dispersion of claim 46 wherein said salt comprises tertiary amine salt.

48. An aqueous dispersion of claim 47 wherein the $\alpha,\alpha$-dialkylol alkanoic acid comprises 2,2-dimethylolpropionic acid.

49. An aqueous dispersion of claim 48 wherein the isocyanate-terminated prepolymer has an acid value of at least about 20 on an unneutralized solids basis.

50. An aqueous dispersion of claim 49 wherein said tertiary amine salt comprises triethylamine salt.

51. An aqueous dispersion of claim 39 wherein said aromatic polyisocyanate comprises diphenylmethane diisocyanate.

52. A stable, aqueous dispersion of urea-urethane polymer, said polymer consisting essentially of tertiary amine salt urea-urethane of polyamine comprising diamine and a tertiary amine salt of a carboxylic acid group-containing, oxime-blocked isocyanate-terminated urethane prepolymer, said prepolymer being of aromatic diisocyanate and polyol comprising dihydroxy alkanoic acid and polyether polyol, and said oxime-blocked isocyanate groups of said prepolymer being capable of reacting with said polyamine at a temperature of less than about 95° C. within a time period of up to about 18 hours, said tertiary amine salt content of said urea-urethane being sufficient to provide a stable aqueous dispersion of said urea-urethane salt which is infinitely dilutable with water, and said polyamine has more than two nitrogen atoms having active hydrogen per molecule of polyamine.

53. An aqueous dispersion of claim 52 wherein said aromatic polyisocyanate comprises diphenylmethane-4,4'-diisocyanate.

54. An aqueous dispersion of claim 52 or 53 wherein said polyether polyol has a molecular weight of about 1000 to 2500, and comprises up to about 95 weight percent of said polyol.

55. An aqueous dispersion of claim 54 wherein said dihydroxy alkanoic acid comprises $\alpha,\alpha$-dialkylol alkanoic acid.

56. An aqueous dispersion of claim 55 wherein the $\alpha,\alpha$-dialkylol alkanoic acid comprises 2,2-dimethylolpropionic acid.

57. An aqueous dispersion of claim 56 wherein said tertiary amine salt comprises triethylamine salt.

* * * * *